United States Patent [19]
Burg

[11] Patent Number: 5,934,215
[45] Date of Patent: *Aug. 10, 1999

[54] STABILIZED AIR CUSHIONED MARINE VEHICLE

[76] Inventor: Donald E. Burg, 15840 SW. 84th Ave., Miami, Fla. 33157

[*] Notice: This patent is subject to a terminal disclaimer.

[21] Appl. No.: 08/850,979

[22] Filed: May 5, 1997

Related U.S. Application Data

[63] Continuation-in-part of application No. 08/823,891, Mar. 17, 1997, Pat. No. 5,839,384, which is a continuation-in-part of application No. 08/818,311, Mar. 14, 1997, Pat. No. 5,860,380, which is a continuation-in-part of application No. 08/483,971, Jun. 7, 1995, Pat. No. 5,626,669, which is a continuation-in-part of application No. 08/468,876, Jun. 6, 1995, Pat. No. 5,611,294.

[51] Int. Cl.⁶ ................................. B63B 1/30; B63B 1/38
[52] U.S. Cl. ....................... 114/67 A; 114/273; 114/282
[58] Field of Search ................ 114/56, 61, 67 A, 114/272, 273, 280, 282, 283, 289, 290, 291, 121, 122; 244/106

[56] References Cited

U.S. PATENT DOCUMENTS

| | | | |
|---|---|---|---|
| 1,307,135 | 6/1919 | Lake | 114/67 A |
| 2,343,645 | 3/1944 | Dickinson et al. | 244/106 |
| 3,606,857 | 9/1971 | Sundquist | 114/67 A |
| 3,804,049 | 4/1974 | Greer | 114/273 |
| 3,968,762 | 7/1976 | Meyer, Jr. | 114/67 A |
| 5,626,669 | 5/1997 | Burg | 114/67 A |

FOREIGN PATENT DOCUMENTS 0 271 372 A1   6/1988   European Pat. Off. ............. 114/67 A

OTHER PUBLICATIONS

"A no-skirts SE Hybrid", Ship & Boat International, May 1992, p. 35.

Primary Examiner—Sherman Basinger
Attorney, Agent, or Firm—Robert J. Van Der Wall

[57] ABSTRACT

An improved pressurized gas supported marine vehicle that is, in its preferred embodiment long and slender and stabilized by outrigger hulls, is presented. This vehicle, known as SeaLance because of its optimal very fine entry bow and narrow fine main hull, is also capable of full or partial airborne operation when equipped with sidewings. When waterborne, an artificially pressurized gas cushion is disposed in an open bottomed recess in the main hull. First and second, forward and aft, air cushions can be used to maintain a higher gas cushion pressure aft than forward which reduces water blowout at the bow and aids in trimming of the vehicle. Further, labyrinth seals can be disposed on recess intermediate and aft seals to aid in sealing of gas flow. An optional feature of SeaLance is one or more water stabilizers that can include hydrofoils and/or a small lifting body. The water stabilizer(s) would normally retract into an open bottomed recess in the main hull when not used. The sidewings can be built to be fixed or retractable and, further, can include winglets that can further include wingcaps to improve aerodynamic efficiencies. It is possible to seal the main blower(s) such that a small gas pump can be used to then either maintain cushion pressure for extended periods while dockside or evacuate gas from the cushion to render the vessel into a semi-submerged state.

22 Claims, 7 Drawing Sheets

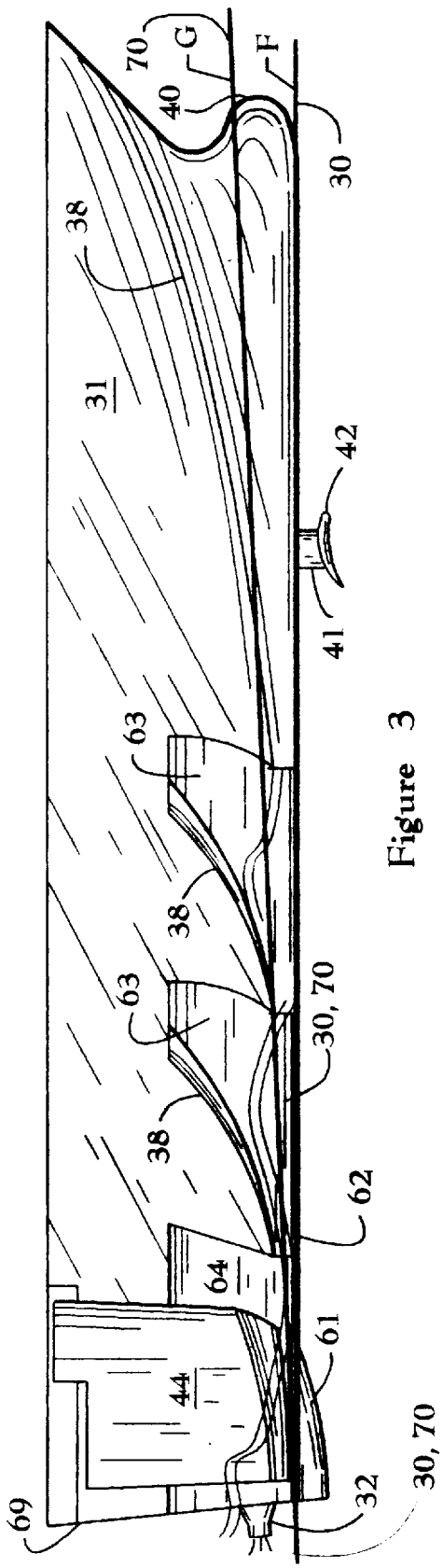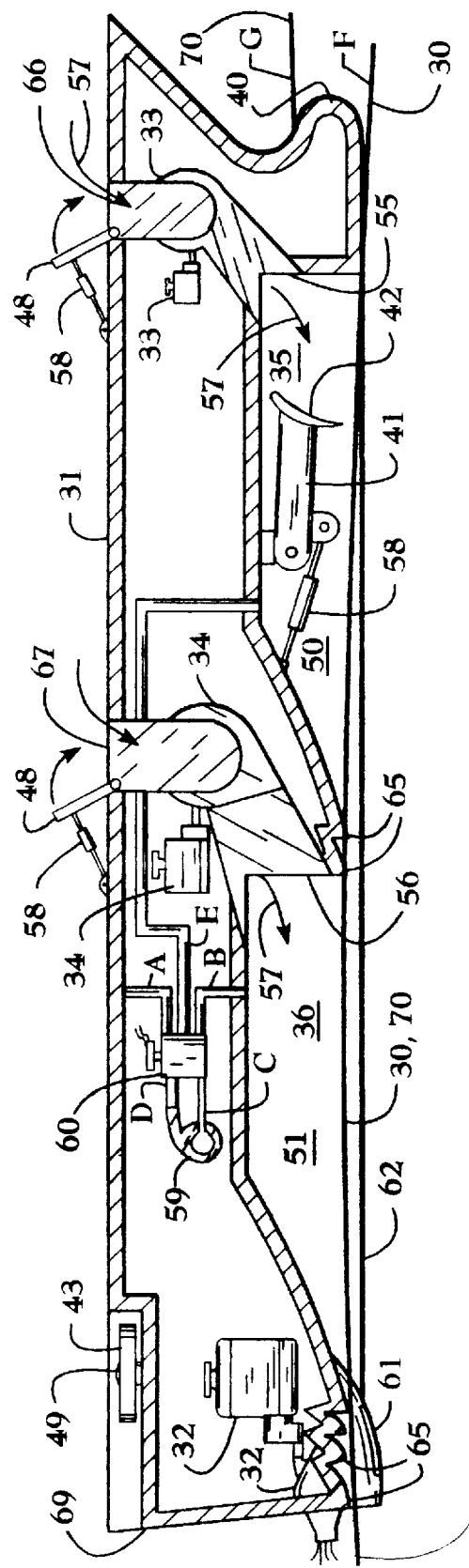

STABILIZED AIR CUSHIONED MARINE VEHICLE

CROSS REFERENCE TO OTHER APPLICATIONS

This application is a continuation-in-part of applicant's earlier filed application Ser. No. 08/823,891 filed Mar. 17, 1997, now U.S. Pat. No. 5,839,384, which is a continuation-in-part of Ser. No. 08/818,311 filed Mar. 14, 1997, now U.S. Pat. No. 5,860,380, which is a continuation-in-part of Ser. No. 08/483,971 filed Jun. 7, 1995, now U.S. Pat. No. 5,626,669, and which is a continuation-in-part of Ser. No. 08/468,876 filed Jun. 6, 1995, now U.S. Pat. No. 5,611,294.

FIELD OF THE INVENTION

The instant invention describes marine vehicles that operate in a surface effect condition by entrapping a cushion(s) of artifically pressurized gas between the vehicle and a water surface and/or a ram effect of ambient air that is sandwiched between the vehicle and a water or other surface at higher vehicle speeds. The first are most commonly called hovercraft or Surface Effect Ships (SES's) and the latter Wing in Ground Effect (WIG), Wing in Surface Effect Craft, or simply wingships. The common thread of all of these vehicles is that the pressurized gas disposed between the vehicle and the supporting medium carries much of vehicle weight. In any case, overall efficiencies of the SES are much greater than conventional marine vehicles and overall efficiencies of the WIG are much greater than commercial aircraft.

Applicant's earlier developments of marine vehicles using artifically pressurized supporting gas cushions have been successful and have resulted in a number of vehicles being built. The most promising concept that is just now close to production status is called SeaCoaster. SeaCoaster is, in its preferred embodiment, a catamaran with open bottomed recesses in each catamaran sidehull with said recesses artifically pressurized with gas. The gas cushions thus formed support some 85–90 percent of vehicle weight when waterborne. SeaCoaster is described briefly in an article on page 35 in the May 1992 issue of "Ship & Boat International" magazine in an article titled "A no-skirts SES hybrid". SeaCoaster offers a very stable, due to its widely spaced sidehulls, and heavy load carrying vehicle; however, there are certain applications where a very long and fine single hull offers unique advantages.

Applicant therefore proposes a very fine long and thin gas cushion supported marine hull. Because of its normal very fine entry wave slicing bow, it is referred to as SeaLance. SeaLance's high Length to Beam (L/B) gas cushions have virtually no takeoff or "Hump" drag characteristic. As such, very large SeaLance vehicles can cruise with very low power requirements in what would have been a very high drag "Hump" condition for a standard low L/B SES. SeaCoaster, although having less "Hump" drag than the low L/B SES still has more than SeaLance in such condition. The fact that SeaLance has a very fine entry bow makes for an exceptionally good riding vehicle in rough seas.

SeaLance's fine entry bows are made possible by use of very low divergence sidehull keels on either side of its gas cushion(s). Other prior art single air cushion cannot do this because of related instabilities. The shortcoming of a high L/B air cushion craft, such as a high L/B SES, is that they are lacking in roll stability due to their narrow beams. SeaLance resolves this by use of outrigger hulls. Outrigger hulls are not new in concept and have been used by south Pacific islanders for many years. However, their application to the open bottomed recess air cushioned SeaLance concept that is very unstable without them is unique and totally new. SeaLance, as conceived with its very fine entry and long and slender gas cushion(s), could basically roll over in rough seas when its gas cushion(s) is pressurized were it not for its outrigger hulls.

Several attachment means for outrigger hulls on SeaLance are given herein. These include: fixed structure, hinged to rotate aft of the vessel when off-cushion, hinged to rotate below the vessel when off-cushion, or hinged to rotate above the vessel when off-cushion. Note that the outrigger hulls would normally be locked in an extended position to each side of the main air cushioned hull when on-cushion. Other connection systems than hinges can also be used to connect sidewings.

An immediate application of SeaLance as a waterborne vehicle that comes to mind is as a small patrol craft where seaworthiness and stealth are prime considerations. Its long fine entry bow insures ultimate seakeeping abilities while an optional feature allows minimum air draft and hence minimum radar signature when laying in wait for smugglers, etc. The latter feature is accomplished by a gas pump that evacuates all gas from SeaLance's gas cushions and thereby sucks it down very low in the water into a semi-submerged condition. When the enemy is seen, the evacuating gas pump is turned off and the main cushion blower(s) powered up and the chase is on.

Another waterborne application of SeaLance is as a large military combatant, large freighters, liners, or any large ship that would operate at relatively low speed/length ratios. The power to drive such a craft is expected to be only about half of that of today's comparable vessels due, of course, to the water friction reducing gas cushion of SeaLance.

It is also possible to have SeaLance translate to an airborne or at least partial airborne mode at high operational speeds. This would normally occur at very high waterborne speeds near the 70–100 knot area. Outrigger hull wings, and possibly additional winglets, provide the added aerodynamic lift for airborne operation of SeaLance. Note that for purposes of this application high speed waterborne operation is defined as being over 15 knots.

The airborne capability adds another new dimension to patrol craft. A patrol craft SeaLance can lie in wait with its air cushion(s) evacuated in the aforementioned semi-submerged stealth condition. Its main blowers are then energized and it pops up to chase down the enemy. It can now also become airborne for very high speed chase or other applications. Of course, the high speed airborne abilities of SeaLance are not limited to small patrol craft and applications for very large WIG SeaLance craft abound. Some other application are as large transoceanic passenger liners and troop carriers where high over water speeds and low cost per passenger mile are important. Another is as a crew and critical part supplier to offshore oil rigs where the ability to land alongside an offshore rig is necessary. SeaLance all of the aforementioned features and more, including rough water stabilizers, while being simple and low in cost to manufacture and maintain.

The instant SeaLance invention offers advancements over applicant's earlier inventions as well as over the prior art. These advancements are discussed in some detail in the following sections.

SUMMARY OF THE INVENTION

The principal object of the instant invention is provide a superior marine vehicle that is primarily supported by pressurized gas.

It is a directly related object of the invention that the pressurized gas can be supplied by artificial means when the marine vehicle is in a waterborne mode and, at least partially, by aerodynamic lift forces when in an airborne mode.

It is another object of the invention that a main hull of the marine vehicle shall have an open bottomed recess for containing part of an artifically pressurized gas cushion when waterborne.

A directly related object of the invention is that such open bottomed recess be, at least partially bounded by sidekeels.

It is a directly related object of the invention that sidekeels diverge going aft from a bow.

Another related object of the invention is that, in the preferred embodiment, a total divergence angle of said sidekeels be no more than 26 degrees.

As a further direct refinement of the preceding, it is a more optional limitation of the invention that the sidekeels total divergence angle be no more than 22 degrees.

Yet another direct related object of the invention is that the sidekeeps total divergence angle be no more than 18 degrees for best rough water performance.

It is a further related object of the invention that divergence of the sidekeels be substantially symmetrical about a vertical centerline plane of a main hull in the preferred embodiment of the invention.

A related object of the invention is that the sidekeels become more parallel going aft after diverging.

It is yet another related object of the invention that sidekeel divergence occurs over at least twenty-five percent of a waterline length of the main hull.

It is a related object of the invention that sidekeel divergence can occur over as little as twenty percent of a waterline length of the main hull.

Yet another object of the invention is that the main hull when waterborne, as seen in a calm sea waterline with its gas cushion(s) pressurized and traveling forward at high speed, is substantially boat shaped with a narrow bow transitioning to more parallel sections aft.

It is a related object of the invention that, as seen in a calm sea surface waterline with the bow of the main hull submerged by a defined angle as a function of hull waterline length, there is a clear limitation on the average total divergence angle of the hull outside water contacting surfaces above the recess sidekeels as this makes for best rough sea ride qualities.

A directly related object of the invention is that the average total divergence angle of the outside hull water contacting surfaces above the sidekeels as described in the just preceding paragraph be less than 26 degrees.

It is another directly related object of the invention that the total divergence angle of the just defined hull outside water contacting surfaces above the sidekeels be less than 22 degrees.

It is yet another directly related object of the invention that the total divergence angle of the just defined hull outside water contacting surfaces above the sidekeels be less than 18 degrees for very best rough water ride characteristics.

It is a related object of the invention that further submergence of the main hull bow, as occurs when passing through large waves, still requires similar limitations on sidekeel and hull side divergence at the waterline to allow a knifing of the main hull through such large waves with minimum shock or impact loads to the hull.

It is another object of the invention that a recess aft seal be utilized to restrict gas leakage from an aft end of the recess.

Another object of the invention is that the marine vehicle can optionally contain a forwardly extending wave slicing lower bow that is referred to as a SeaSaber bow.

It is a related object of the invention that said open bottomed recess can contain two, noted as first and second recesses, or more smaller recesses.

It is a further related object of the invention that the smaller recesses can be separated by a recess intermediate seal member.

A related object of the invention is that two or more smaller recesses can be be considered as part of one larger recess for purposes of discussion in this application.

It is a directly related object of the invention that a first and a second open bottomed recess can be maintained at different pressures with the forward, first recess, at the lower pressure to reduce blowout of water from the bow area.

Yet another object of the invention is that labyrinth seals can be disposed on lower surfaces of recess intermediate and/or recess aft seal members.

It is also an object of the invention that recess intermediate and/or aft seals preferably be, as seen in a vertical transverse plane of the main hull, angled to horizontal over a majority of their width.

It is a directly related object of the invention that the recess intermediate and/or aft seals have, at least in part, and inverted-V shape.

It is another object of the invention that sealing means, that seal at least 90 percent of gas leakage, can be utilized to stop gas flow through the main gas cushion pressurizing blowers.

A directly related object of the invention is that a gas pump and valve system can be used to either maintain pressure in the gas cushion recess(es) or evacuate gas from the gas cushion recess(es).

It is a related object of the invention that outrigger hulls can be utilized either side of the main hull to aid in stability.

It is a directly related object of the invention that said outrigger hulls can be either fixed or retractable.

It is another directly related object of the invention that retraction of outrigger hulls can be up and/or down or forward and/or aft.

It is a related object of the invention that winglets can also be applied to aid in aerodynamic lift.

It is a directly related object of the invention that wingcaps can be applied to winglets to further improve aerodynamic efficiencies.

It is yet another object of the invention that sidewings can be applied to the main hull.

It is an object of the invention that the marine vehicle is capable of airborne operation by takeoff from a water surface.

It is a related object of the invention that propulsion can be either water or air propulsors or a combination of both.

Another feature of the invention is the application of a water stabilizer(s) where said water stabilizer can include a hydrofoil and/or a small lifting hull member.

It is a directly related object of the invention that a water stabilizer can retract into a gas cushion recess of the main hull.

It is another object of the invention that vertical water deflecting sidesteps can be located in sidewalls of the main hull.

A directly related object of the invention is that such sidesteps include chines where said chines start vertically high at a front portion of the sidestep and then swoop down to proximal a height of a chine disposed forward of said sidestep.

A directly related object of the invention is that, at mid-range vehicle speed to length rations, recess sidekeels and outboard surfaces can be of simple hard chine planing design.

It is a further directly related object of the invention that, at lowest vehicle speed to length ratios, the recess sidekeels are preferably of curvilinear shape to minimize water contact area as well as turbulence generation.

The invention will become better understood upon reference to the drawings and the detailed description of the invention which follow in which:

BRIEF DESCRIPTION OF THE DRAWINGS

FIG. 3 is a profile view of the SeaLance of FIG. 2. Water-line F deplicts an ideal trim angle for calm sea running while waterline G is a condition where the bow is slightly down or submerged at an angle of about 3 degrees.

FIG. 4 is a cross sectional view, as taken through line 4—4 of FIG. 2, the shows blowers, gas cushion recesses, retracted water stabilizer, and other details.

DETAILED DESCRIPTION

Figure 1:
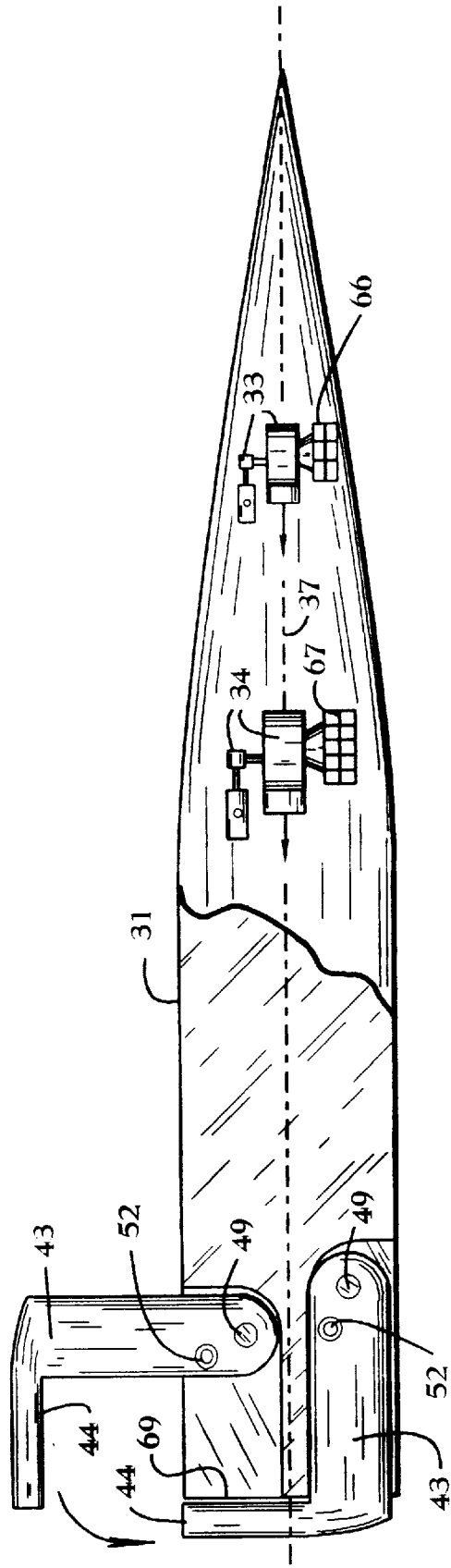
FIG. 1 presents a top plan view of the inventive SeaLance hull showing a port outrigger hull extended into position and a starboard outrigger hull retracted behind the main hull. In this depiction, part of the forward deck is removed showing first and second blower assemblies.

FIG. 1 presents a top plan view of the inventive SeaLance showing main hull 31, outrigger hulls 44, outrigger wings 43, hinge pins 49, locking pins 52, and a main hull vertical centerline plane 37. Note that the port outrigger hull is locked in its usable or extended position and the starboard outrigger hull is stored aft of a transom 69 in this illustration. Also shown, with a forward portion of the top deck removed, are a first blower assembly 33 and its first gas inlet 66 and a second blower assembly 34 and its second gas inlet 67.

Figure 2:
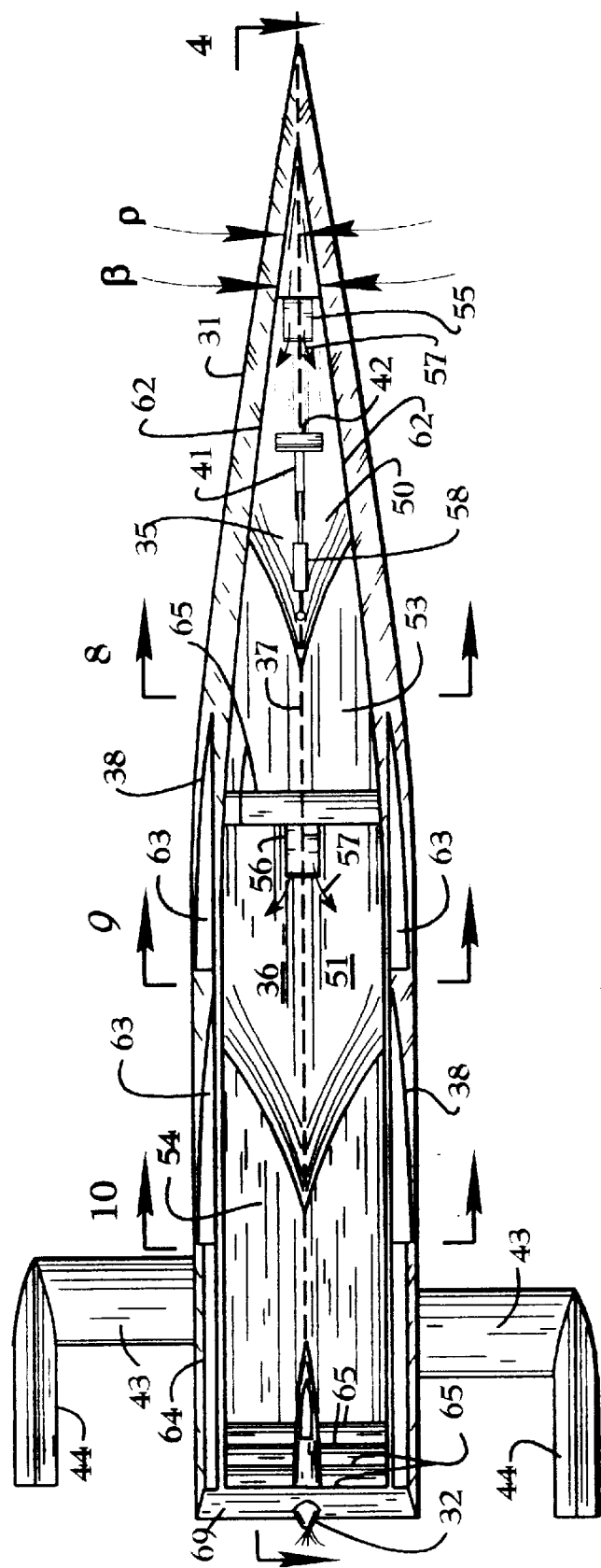
FIG. 2 is a bottom plan view of the same SeaLance configuration as presented in FIG. 1 but with both outrigger hulls extended.

FIG. 2 is a bottom plan view of the same SeaLance but with both port and starboard outriggers extended for normal operation. Note the very fine pointed bow of the main hull 31. It has been established in tests by applicant of waterborne SeaCoaster hulls that a total divergence angle (B) of sidekeels 62, as seen in a calm sea surface waterline with gas cushion(s) 50, 51 pressurized and the SeaLance traveling forward at high speeds, should be less than 26 degrees for good seakeeping qualities. Actually a total divergence angle (B) of less than 22 degrees is better and actually less than 18 degrees preferred. A partial angle (P) is noted as occurring either side of a vertical centerline plane 37 of the main hull. The best design situation occurs when sidekeel divergence is substantially symmetrical about said vertical centerline plane 37. It is important to note that the actual water contacting surfaces forward are the outside surfaces of the main hull and while these are considered as being defined by the total angle of divergence of the sidekeels that they will be further defined in following discussions of FIGS. 3, 14, and 15.

Also shown in FIG. 2 are first open bottomed recess 35, first pressurized gas cushion 50, second open bottomed recess 36, second pressurized gas cushion 51, recess first or intermediate seal 53 and recess aft seal 54. Note the use of labyrinth seals 65 inset into each of the just mentioned recess intermediate and aft seals. Further shown are main hull chines 38, sidesteps 63, side insets 64, first blower discharge opening 55, second blower discharge opening 56, air flow arrows 57, and water propulsor 32. Additionally, a water stabilizer 41 which includes a hydrofoil 42 is shown retracted into first recess 35 as is powered by actuator 58.

FIG. 3 is a starboard side profile view of a main hull 31 that also shows an outrigger hull 44 in its extended position. Note that the water contacting portion of outrigger hull 44 is preferably at a significantly higher elevation than the the sidehull keels 62 of the main hull to reduce outrigger hull water drag forces. Water line 30 gives some idea of how water is deflected from the main hull sides. Chines 38 swoop down from forward to aft in way of the sidesteps 63 to proximal an elevation of a chine preceding such sidestep in the preferred embodiment. Also shown is the optional SeaSaber forwardly extending wave slicing bow 40. Waterline F 30 represents an ideal condition when the SeaLance is operating at optimum trim in a calm sea. Waterline G 70 shows the bow down slightly as would occur when the hull is trimmed down by the bow or encountering a wave. The actual angle here is about three degrees down by the bow. Note that a standard bow can be used here rather than the SeaSaber bow 40 and that in such case a deck of the main hull 31 can simply be extended forward so that the SeaSabre bow is simply absorbed into the main hull 31.

FIG. 4 is a cross sectional view, as taken through line 4—4 of FIG. 2, that shows first blower assembly 55 and second blower assembly and sealing means 48 that can be closed to effect sealing of blower passages. Note that a sealing of at least 90 percent is expected from such sealing means 48. Actuators 58 are also shown. A gas pump 59 and valve 60 are utilized in a unique system that can either maintain gas cushion(s) pressurized at dockside or evacuate gas cushion(s) to semi-submerge the main hull. Function of this gas pump and valve are: 1) To maintain pressure, A is open to C and D is open to B and E; 2) To evacuate the gas cushions, B and E are open to C and D is open to A.

Other things to note in FIG. 4 are a waterjet inlet 61 for the waterborne propulsor 32, the retracted into first gas cushion water stabilizer 41 which in this case comprises a hydrofoil 42, and labyrinth seals 65. It is important to note that a first gas cushion 50 can be at considerably lower pressure than a second gas cushion 51. This is particularly important for very large SeaLance marine vehicles since, on a 750 foot SeaLance for example, a transom depth of about 14 feet is quite possible which calls for very high pressures in the second gas cushion. Those high pressures would cause an excessive amount of "blow-out" of water around the first gas cushion so therefore the reason for differential pressures. The labyrinth seals also primarily needed for the very large SeaLances since such very high cushion pressures in the second gas cushion would call for extremely high blower powers. The labyrinth seals greatly reduce the required blower power levels. Note that either only one or more than the two gas cushions and recess shown can be utilized if necessary in a particular application.

Figure 5:
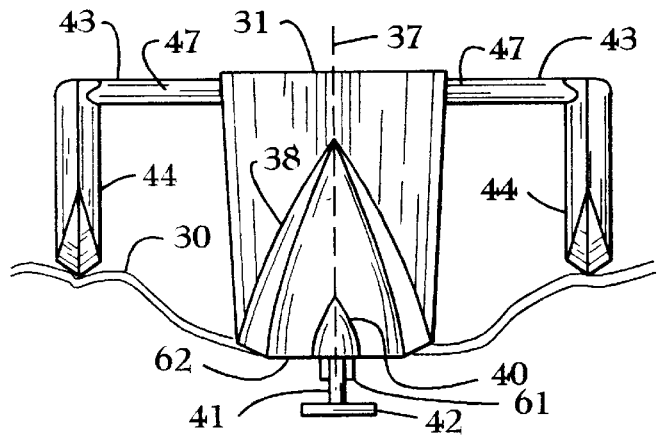
FIG. 5 presents a bow view of SeaLance with outriggers in place.

FIG. 5 presents a bow view of a waterborne SeaLance with its outrigger hulls 44 locked into position for maximum roll stability. Note that outrigger hulls can be permanent structure and not retractable if desired and that is certainly considered as an option of the instant invention.

Figure 6:
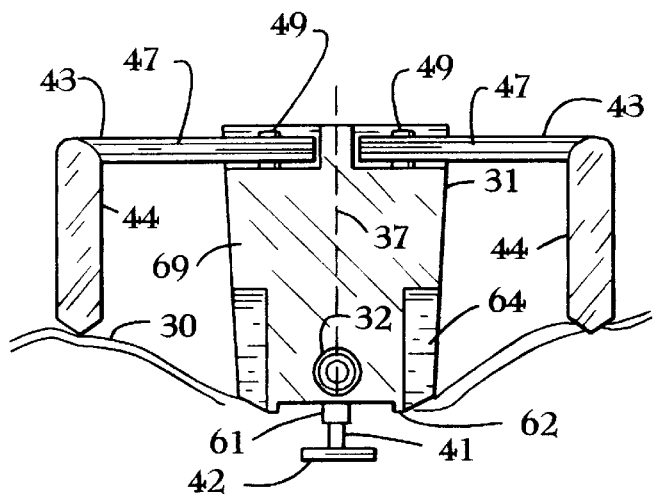
FIG. 6 is a stern view of the same SeaLance as presented in FIG. 5.

FIG. 6 is a stern view of the same SeaLance as presented in FIG. 5. Note that the outrigger hulls are much higher than the main hull 31 and riding on a bow wave from the main hull here.

Figure 7:
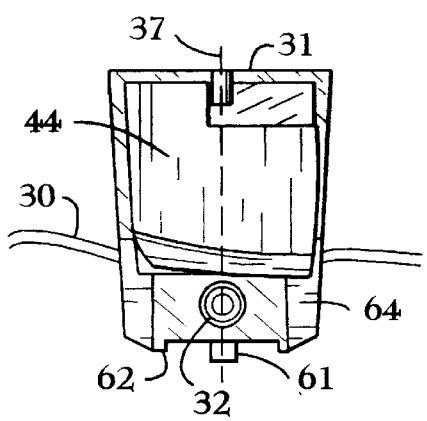
FIG. 7 is a stern view of the same SeaLance as shown in FIGS. 5 and 6 but with its outrigger hulls retracted behind a transom of the main hull. Note that in this instance the gas cushion is not pressurized and therefore the main hull is lower in the water to add to main hull stability since the outriggers are not effective here.

FIG. 7 is another stern view of the same SeaLance as shown in FIGS. 1 through 6 but with the outrigger hulls retracted behind the transom for docking. Note that the gas cushions are evacuated here as is shown by the high waterline 30. It is generally considered best to have gas cushions not pressurized when the outrigger hulls are retracted for adequate stability.

Figure 8:
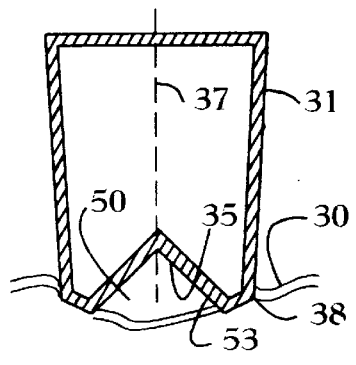
FIGS. 8, 9, and 10 show cross sections of the main hull, as taken through lines 8—8, 9—9, and 10—10 of FIG. 2.

FIG. 8 is a cross section, as taken through a vertical transverse plane of the main hull noted by line 8—8 in FIG. 2, that shows preferred inverted-V shape of the first or intermediate seal 53. The preferred embodiment of seals of this invention is to have, as seen in a vertical transverse plane of the hull, surfaces angled to horizontal over a majority of their width for best ride qualities in rough seas.

Figure 9:
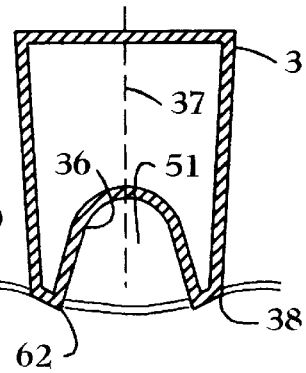

FIG. 9 is a cross section, as taken though line 9—9 of FIG. 2, that shows preferred shape of an open bottomed recess 36.

Figure 10:
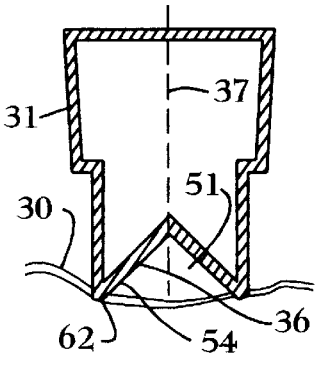

FIG. 10 is a cross section, as taken through line 10—10 of FIG. 2, that shows a preferred inverted-V shape of a recess aft seal.

Figure 11:
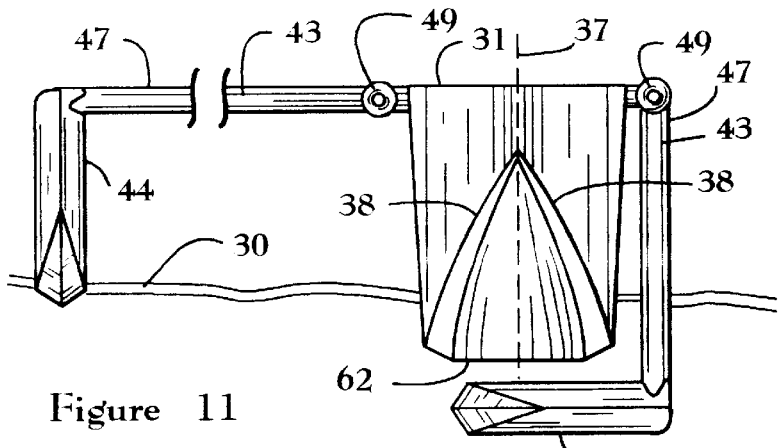
FIG. 11 is a bow view of another arrangement of SeaLance showing an alternative outriggers wing attachment arrangement. In this instance the starboard outrigger wing is in place to add stability and the port retracted or folded to below the main hull.

FIG. 11 presents a bow view of a SeaLance that illustrates retractable outrigger wings 43 that can fold downward below the hull to minimize beam. This is normally accomplished using hinges 49 or other mechanical folding means, not shown.

Figure 12:
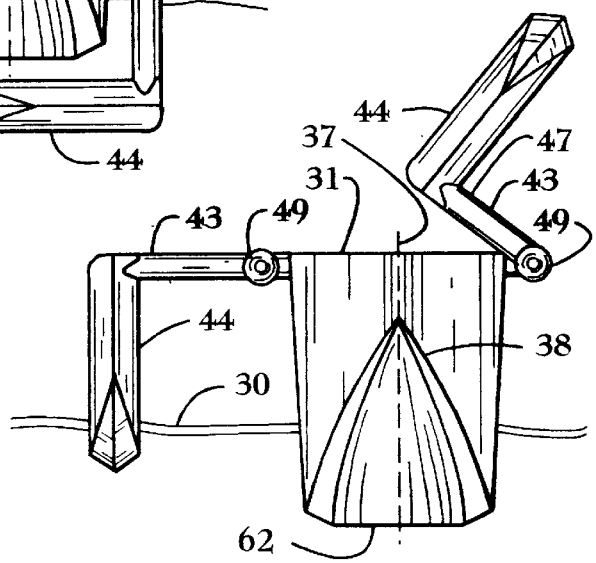
FIG. 12 is a bow view of a similar SeaLance as shown in FIG. 11 but with the port outrigger wing folded upward.

FIG. 12 is a bow view of a similar SeaLance as presented in FIG. 11 shows outrigger wings 43 folded in an up position for docking rather than down.

Figure 13:
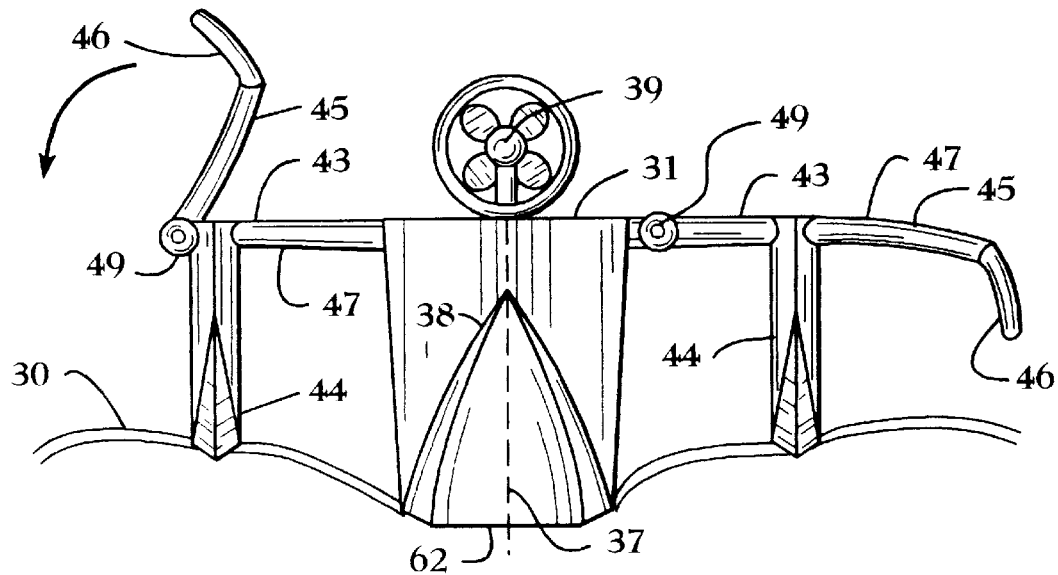
FIG. 13 is a bow view of a SeaLance with winglets added for additional aerodynamic lift. Note the starboard winglet is folded for docking in this instance.

FIG. 13 is a bow view of a SeaLance that has the addition of winglets 45 to further aid in generating aerodynamic lift.

These winglets 45 also have wingcaps 46 here to aid in aerodynamic lift efficiency. The starboard winglet is retracted here to aid in close quarters waterborne maneuvering.

Figure 14:
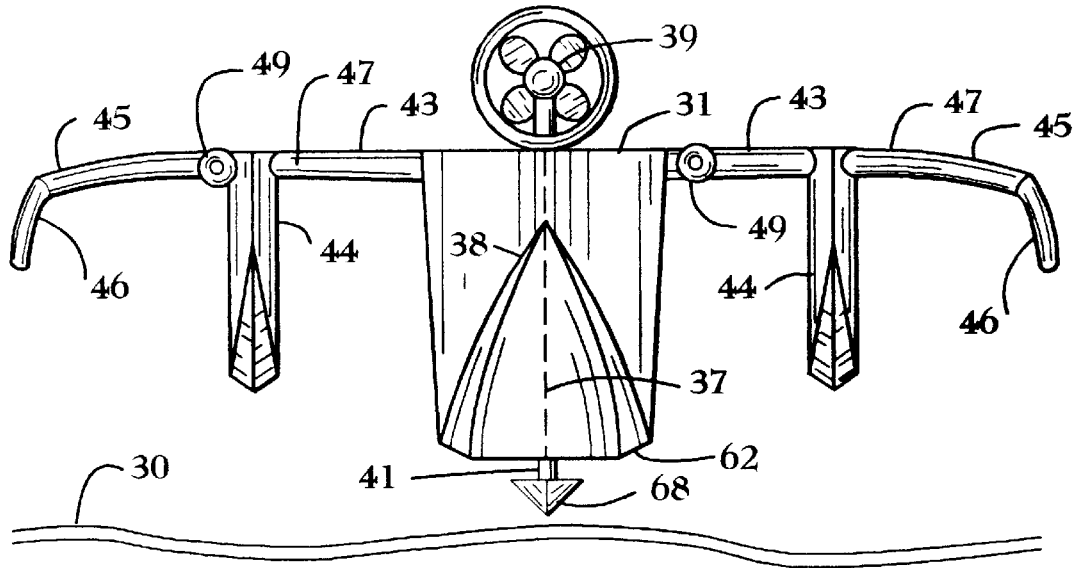
FIG. 14 shows a similar SeaLance to that shown in FIG. 13 but with all sidewings locked into position and the SeaLance airborne. Note the air propulsor and the water stabilizer in the form of a lifting body that is shaped like a small boat here.

FIG. 14 is a bow view of the same SeaLance as presented in FIG. 13 but with sidewings 47 totally locked into position and the SeaLance airborne. Note the air propulsor 39 which is preferred for airborne operation. Note also the water stabilizer 41 which in this case has a lifting body 68 that is boat shaped to aid in takeoffs and landings.

Figure 15:
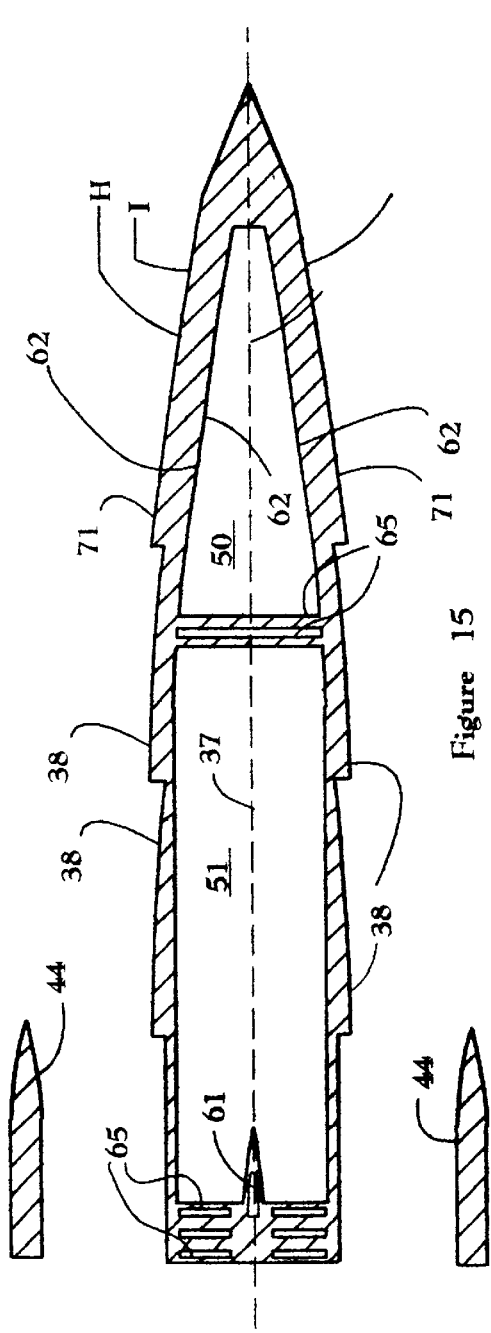
FIG. 15 presents an outline of the hull waterline contact area when operating at high speed in a calm sea and trimmed to waterline F of FIG. 3.

FIG. 15 presents a view of the waterline intersection, as seen when operating in a calm sea, in the plane of waterline F of FIGS. 3 and 4. Note the water contacting hull outer surfaces 71 have a total average divergence angle I of less than 26 degrees with less than 22 degrees better and less than 18 degrees optimum. These total divergence angles are selected to provide good ride qualities in combination with providing sufficient divergence to allow an adequate sized gas cushion area. The half angle divergence angle H is also shown.

Figure 16:
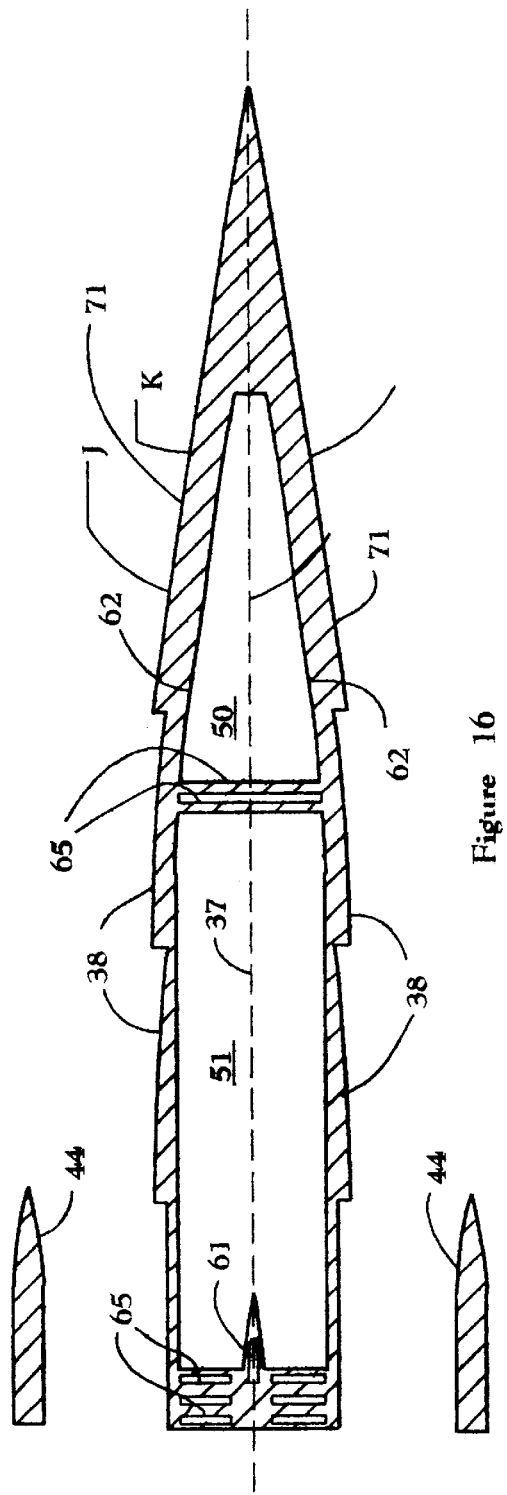
FIG. 16 shows the outline of the hull waterline contact area when operating at high speed in a clam sea and trimmed bow down to waterline G of FIG. 3. Note the fine entry of the bow outer surfaces and the longer waterline length to that presented in FIG. 16.

FIG. 16 is the same general situation showing the waterline intersection as does FIG. 15 but for the bow down situation as defined by calm sea waterline G of FIGS. 3 and 4. Note that the total divergence angle K and half divergence angle J are deplected here. The water contacting hull outer surfaces 71 are preferably held to the same divergence angle limitations as just given in the description of FIG. 15 preceding for best ride qualities.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sold definition of the invention.

What I claim is:

1. In an improved marine vehicle that is at least partially supported by an artificially pressurized gas cushion, the improvement comprising:

a main hull having a recess built into its underside wherein the gas cushion is at least partially disposed between the main hull and a water surface such that said recess acts as part of restraining means for the pressurized gas cushion and said recess is bordered, at least in part, by sidekeels and an aft gas restraining seal and wherein, as seen in a calm sea surface waterline with a sidekeel at a hull's bow lower than a sidekeel at a hull's stern by up to three (3) degrees, an average total divergence of water contacting side surfaces of said bow, as a sum of a divergence angle either side of a vertical centerline plane of said main hull, is less than twenty-six (26) degrees and wherein a forward portion of the recess in the main hull, as seen in a calm sea surface waterline with the recess pressurized with gas, is on average narrower than an aft portion of said recess; and which further comprises outrigger hulls disposed either side of the main hull with mechanical communication of said outrigger hulls with the main hull including outrigger wings.

2. The improved marine vehicle of claim 1 wherein said recess aft gas restraining seal, as seen in a vertical transverse plane of the main hull, is angled to horizontal over a majority of its width.

3. The improved marine vehicle of claim 1 which further comprises water deflecting steps inset into a side surface of the main hull.

4. The improved marine vehicle of claim 1 which further comprises at least one recess intermediate seal.

5. The improved marine vehicle of claim 1 wherein the sidekeels bordering the forward portion of the recess in the main hull, as seen in a calm sea surface waterline with the recess pressurized with gas, diverge from each other going aft from the main hull's bow by less than twenty-six (26) degrees.

6. The improved marine vehicle of claim 1 wherein the sidekeels bordering the forward portion of the recess in the main hull, as seen in a calm sea surface waterline with the recess pressurized with gas, diverge from each other going aft from the main hull's bow and then become more parallel over their aft portions wherein said divergence of the sidekeels takes place over more than twenty-five (25) percent of a waterline length of the main hull.

7. The improved marine vehicle of claim 1 wherein the sidekeels bordering the forward portion of the recess in the main hull, as seen in a calm sea surface waterline with the recess pressurized with gas, diverge from each other going aft from the main hull's bow and then become more parallel over their aft portions wherein said divergence of the sidekeels takes place over at least twenty (20) percent of a waterline length of the main hull.

8. The improved marine vehicle of claim 1 wherein said outrigger hulls are retractable.

9. The improved marine vehicle of claim 1 which further comprises winglets disposed, at least in their majority, outboard of the outrigger hulls.

10. The improved marine vehicle of claim 1 which further comprises a water stabilizer wherein said water stabilizer can at least partially retract into the recess in the main hull and wherein when said water stabilizer is extended to a lowered position it extends substantially below the sidekeels.

11. In an improved marine vehicle that is at least partially supported when waterborne by an artificially pressurized gas cushion with said gas cushion supplied with gas by at least one gas pressurization means, the improvement comprising:

said artificially pressurized gas cushion at least partially disposed in an open bottomed recess in a main hull of said marine vehicle with boundaries of said open bottomed recess at least partially defined by substantially rigid water contacting sidekeels and a recess aft seal and where, as seen in a calm sea surface waterline with the gas cushion pressurized and the marine vehicle waterborne and moving forward at high speed, the main hull is substantially boat shaped with a narrow bow forward that then diverges, by way of the substantially rigid water contacting sidekeels, and with said sidekeels becoming more parallel over their aft portions and wherein an average total divergence angle of said water contacting sidekeels, as measured from the narrow bow to where the sidekeels become more parallel over their aft portions, is on average less than twenty-six (26) degrees and which further comprises outrigger hulls disposed either side of the main hull with mechanical communication of said outrigger hulls with the main hull including outrigger wings.

12. The improved marine vehicle of claim 11 wherein said outrigger hulls are retractable.

13. The improved marine vehicle of claim 11 which further comprises winglets disposed, at least in their majority, outboard of the outrigger hulls.

14. The improved marine vehicle of claim 11 which further comprises a water stabilizer wherein said water stabilizer can at least partially retract into the open bottomed gas cushion recess in the main hull and wherein when said water stabilizer is extended to a lowered position it extends substantially below the sidekeels.

15. The improved marine vehicle of claim 11 which further comprises at least one recess intermediate seal.

16. In an improved marine vehicle including a main hull with said main hull at least partially supported by a gas cushion supplied with pressurized gas by artificial means and with said gas cushion inset into a recess in the main hull and said gas cushion restrained on a lower surface by a water surface, the improvement comprising:

said main hull, as seen in a waterline plane when moving forward in a calm sea with a bow of said main hull down by three (3) degrees from the stern, having a generally boat shaped outer surface with a total divergence angle of outer surfaces of the main hull being less than twenty six (26) degrees and which further comprises outrigger hulls disposed either side of the main hull with mechanical communication of said outrigger hulls with the main hull including outrigger wings.

17. The improved marine vehicle of claim 16 which further comprises winglets disposed, at least in their majority, outboard of the outrigger hulls.

18. The improved marine vehicle of claim 16 which further comprises a water stabilizer wherein said water stabilizer can at least partially retract into the recess in the main hull and wherein when said water stabilizer is extended to a lowered position it extends substantially below a sidekeel.

19. The improved marine vehicle of claim 16 which further comprises at least one recess intermediate seal.

20. The improved marine vehicle of claim 16 wherein the total divergence angle of the outer surfaces of the main hull are less than twenty-two (22) degrees.

21. The improved marine vehicle of claim 16 wherein the total divergence angle of the outer surfaces of the main hull are less than eighteen (18) degrees.

22. The improved marine vehicle of claim 16 wherein one means of sealing pressurized gas into the recess comprises, at least in part, a labyrinth seal.

* * * * *